United States Patent [19]

VandeWalker

[11] 4,182,229
[45] Jan. 8, 1980

[54] AUTOMATIC POPCORN MACHINE

[76] Inventor: James R. VandeWalker, 451 Arlington Ave., Elgin, Ill. 60120

[21] Appl. No.: 832,626

[22] Filed: Sep. 12, 1977

[51] Int. Cl.$^2$ .............................................. A23L 1/18
[52] U.S. Cl. ................................ 99/323.6; 99/323.7; 222/214; 222/363
[58] Field of Search .......................... 99/323.5–323.9; 222/214, 363; 417/475–476; 219/214, 241, 242, 246; 74/25

[56] References Cited

U.S. PATENT DOCUMENTS

| | | | |
|---|---|---|---|
| 1,308,714 | 7/1919 | McCreary | 222/363 |
| 2,017,293 | 10/1935 | Priest | 99/323.7 |
| 2,027,698 | 1/1936 | Parks | 99/323.8 |
| 2,248,812 | 7/1941 | Cretors | 99/323.7 |
| 2,743,663 | 5/1956 | Bruntjen | 99/323.7 |
| 3,444,759 | 5/1969 | Kueny | 74/567 |
| 3,697,289 | 10/1972 | Day et al. | 99/323.7 |
| 3,881,641 | 5/1975 | Pliml | 222/214 |

Primary Examiner—Harvey C. Hornsby
Assistant Examiner—Timothy F. Simone
Attorney, Agent, or Firm—Darbo & Vandenburgh

[57] ABSTRACT

An electric motor drives a cam through one revolution during a corn popping cycle. One end of a pivoted lever bears against the periphery of the cam at its bottom to thereby hold the bottom cover of the popping vessel, secured to the other end of the lever, in place on the bottom of the popping vessel while the corn is being popped and to permit the cover to move away from the bottom of the vessel after it is popped thereby discharging the popped corn. A push rod riding on the top of the cam operates a measuring pocket at the start of the popping cycle to introduce a measured quantity of unpopped corn into the popping vessel at the start of the cycle. An arm extending from a side of the cam moves along a resilient tube filled with popping oil as the cam rotates to pump a measured quantity of oil into the popping vessel. The bottom cover of the popping vessel has a continuously energized heater which maintains the temperature of the cover above ambient but below the normal popping temperature. A second heater in the bottom cover is energized at the start of the popping cycle to raise the temperature to a normal popping temperature during the popping cycle. A second electric motor drives a rotating stirrer which extends axially into the popping vessel from the top.

7 Claims, 9 Drawing Figures

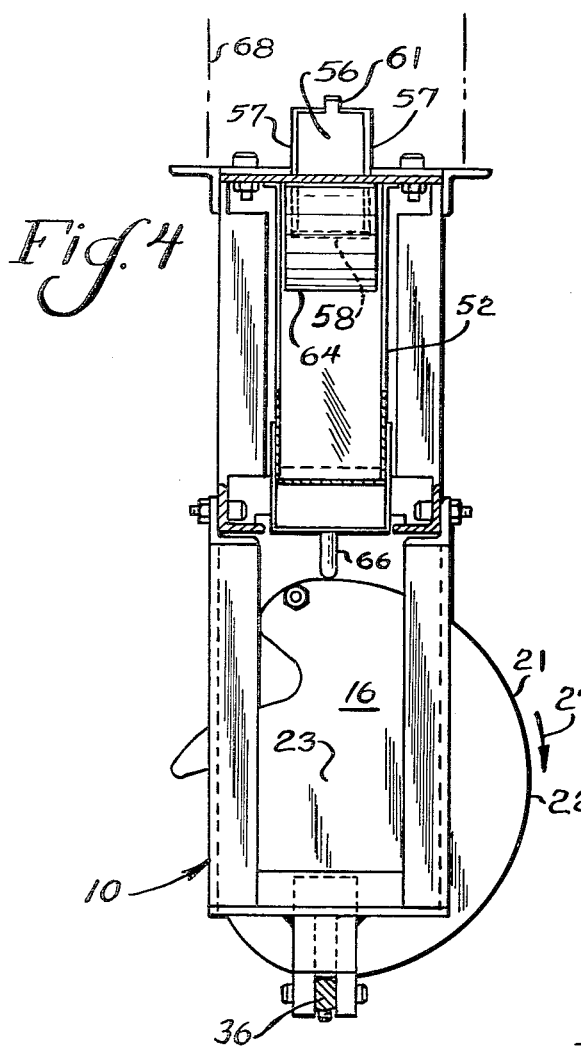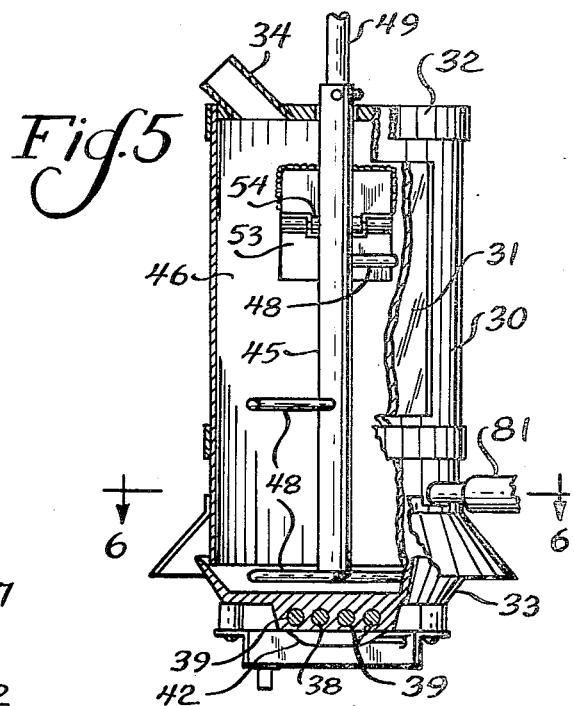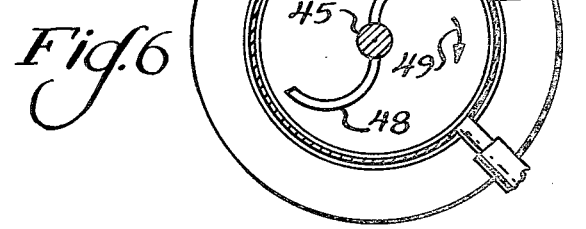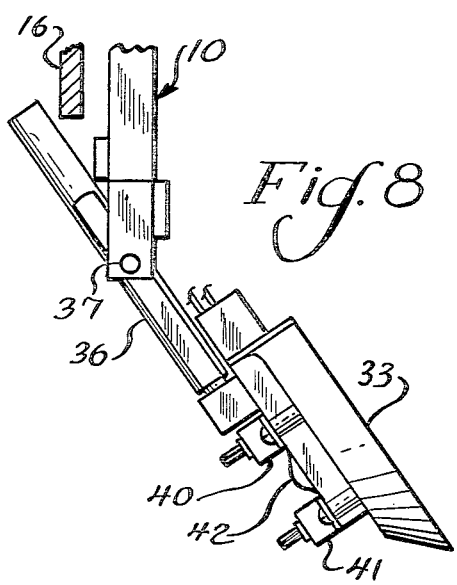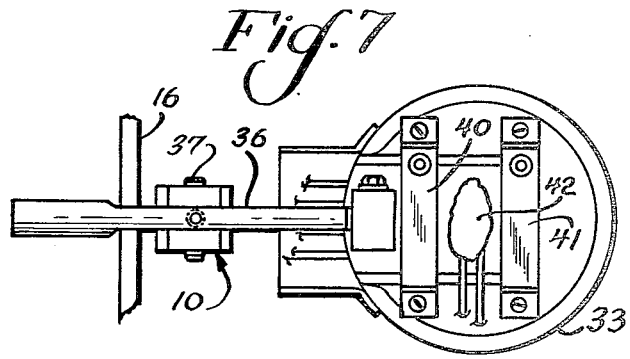

AUTOMATIC POPCORN MACHINE

BACKGROUND AND SUMMARY OF THE INVENTION

The present invention relates to a machine for automatically popping a given quantity of popped corn upon a popping cycle being initiated by the closing of an electric switch and for discharging the corn so popped at the end of the popping cycle. The machine is particularly suited for coin operation wherein that switch is closed by an appropriate amount of money being deposited in a coin slot leading to a coin actuator. Such a machine is particularly suitable to be placed in bars, taverns, soda shops, recreation establishments, etc., and even in a household recreation or rumpus room.

The concept of having an automatic corn popping machine, coin actuated or otherwise, is not novel. However, machines of such a characters that have been proposed and/or constructed in the past have been relatively complicated pieces of machinery. As a consequence they have been expensive both in initial cost and from the standpoint of maintenance. Obviously, both of these factors are very significant to persons owning such a machine.

Due to the complexity, with attendant cost and size problems, such prior art automatic machines have not been widely used. The persons that might otherwise desire to have an automatic popcorn machine on their premises have gone to other alternatives such as, for example, purchasing substantial quantities of previously popped popcorn. That alternative is undesirable because the quality of the popcorn is substantially less than that of freshly popped corn. Another alternative has been the use of popping machines which, though power driven, require manual supervision. To the extent that a person's presence is required, there is an additional cost factor involved. A still further alternative has been to use disposable aluminum trays containing measured quantities of unpopped corn and a suitable fat, with an xpensible cover over the tray. These trays are then placed expansible a machine which heats and shakes them. Such an alternative is undesirable because of the cost factors involved in providing the prepared trays and in the labor involved in placing the trays on the machine and removing them after the corn is popped.

A principal feature of the present invention is its simplicity, which results in an automatic machine that is comparatively low in initial cost and making it relatively maintenance free. Substantially all that the owner of such a machine must do is keep unpopped corn in a supply hopper, a supply of popping oil in a reservoir and a supply of bags or other containers into which the popped corn can be dispensed. This simplicity is in a large measure a result of the employment of a single cam which performs a major share of the operations required during the popping cycle. At the start of the cycle this cam closes the bottom cover on a popping vessel, controls the dispensing of a measured quantity of unpopped corn into the popping vessel and pumps a given quantity of popping oil into the popping vessel. This cam also functions to dictate parts of the operation of the electrical control apparatus which controls the operation of the electric motors and heaters.

A further important feature of embodiments of the invention is that the popping cycle is short, e.g., from a minute to a minute and a half, from the initiation of the popping cycle to the discharge of the popped popcorn. This is, of course, a desirable feature to a person wishing to purchase a quantity of freshly popped popcorn. Such a purchase is an impulse purchase and a person will pass up making the purchase if it is necessary to wait a substantial period of time before the corn becomes available.

A further important feature is the relatively compact arrangement. As a result, the machine may be placed in a relatively small cabinet. This is important to a person having such a machine on his premises, since as the size and bulk of the machine increases, the desirability of having such a machine correspondingly decreases.

Other features and advantages of the invention will become apparent from the following description and drawings.

DESCRIPTION OF THE DRAWINGS

FIG. 4 is a section taken at line 4—4 of FIG. 1;

FIG. 5 is an end view of the popping vessel with portions broken away;

FIG. 6 is a section taken at line 6—6 of FIG. 5;

FIG. 7 is a bottom view of the bottom cover of the popping vessel and its mounting;

FIG. 8 is a fragmentary view showing the bottom cover of the popping vessel when displaced away from the remainder of the popping vessel.

DESCRIPTION OF SPECIFIC EMBODIMENT

Figure 1:
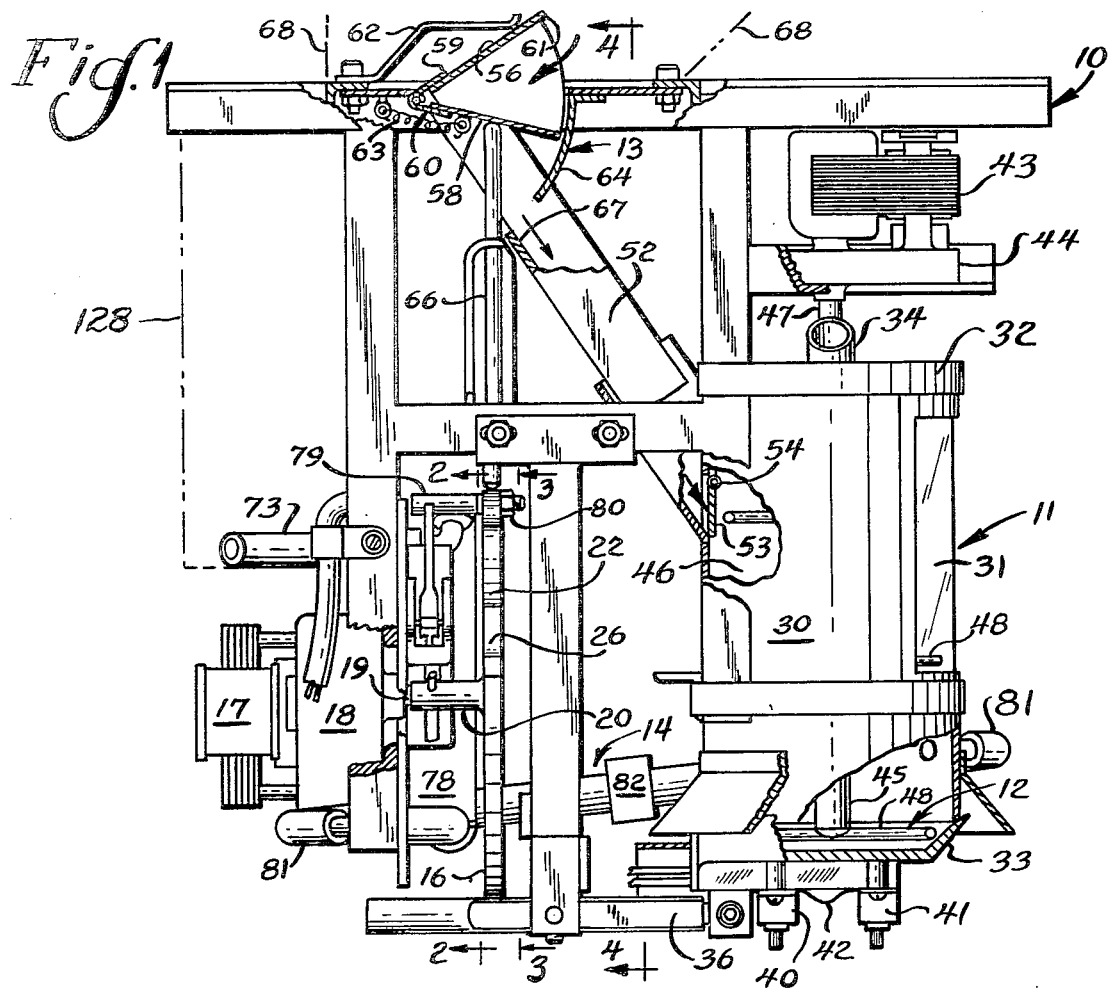
FIG. 1 is an elevational view, with portions broken away, of an embodiment of the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The embodiment shown comprises a frame, generally 10, a popcorn popping vessel, generally 11, a power driven rotary stirrer, generally 12, a feed apparatus, generally 13, for unpopped corn, and a popping oil feed apparatus, generally 14.

Figure 3:
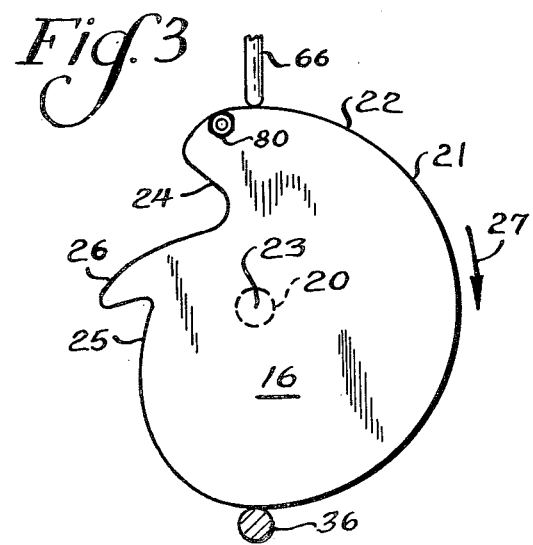
FIG. 3 is a partial section as viewed at line 3—3 of FIG. 1 and showing the cam which performs or controls the major operations.

As previously mentioned, an important feature of the present invention is that most functions are under the control of a cam 16. This cam is driven by an electric motor 17 which incorporates a speed reducer 18. This speed reducer has an output shaft 19 to which is secured the hub 20 of cam 16. Output shaft 19, and thus cam 16, rotates at a speed of 2 RPM. The cam has a peripheral surface 22. The major part 21 of this surface (that part generally to the right side of FIG. 3) is equidistant from the axis 23 of rotation of the cam. The remaining portion of the cam surface has two parts 24 and 25 which are substantially closer to the axis than the main portion. These two parts are separated by a projection 26. The cam rotates in the direction indicated by arrow 27.

The popping vessel 11 includes a cylindrical side wall 30 which has a window 31 therein to enable the popping process to be observed. It also has a fixed top 32 and a movable bottom cover 33. Top 32 has a vent 34 therein.

The bottom cover 33 is secured to one end of a lever 36. Intermediate its ends the lever is pivotally secured to frame 10 by a pin 37. Between this pivotal mounting and its distal end, the lever bears against surface 22 of the cam, whereby the cover normally is held in place as the bottom of the popping vessel.

As best seen in section in FIGS. 1 and 5, the bottom cover 33 is of dished configuration and, at least at the side opposite to that of lever 36, has the inner side sloped. It has been found that having the interior side at about a forty-five degree angle is most suitable. Embedded into this cover are electric heaters 38 and 39, of cartridge configuraton. Thermoelectric switches 40 and 41 are secured to the cover. These are thermally connected to the cover so as to actuate the internal switches thereof (not shown) in response to the temperature of the cover, as in an electric temperature sensor 42.

The stirrer 12 includes an electric stirrer or mixer motor 43 having a speed reduction, gear drive 44. A post 45 is axially positioned within the chamber 46 defined by the popping vessel. This post is secured by set screws to the output shaft 47 of the speed reducer 44. A plurality of stirring arms 48 are secured to post 45. The post and arms rotate in the direction indicated by arrow 49 in FIG. 6. The agitator rotates at a speed of 18 RPM.

The corn feed apparatus 13 includes a chute 52. At the bottom end of this chute is a door 53 where the corn descending the chute enters the popping chamber 46. This door is mounted at its top by a hinge 54. Because of gravity the door normally hangs straight down as illustrated, however, corn kernals descending the chute will have sufficient force to push the door open and permit the kernals of unpopped corn to enter the popping chamber.

At the upper end of the chute is a measuring pocket for dispensing a measured amount of unpopped corn kernals into the chute. This pocket is formed by a top member 56 having side walls 57 integral therewith, and a bottom member 58. Members 56 and 58 are independently connected to frame 10 by hinges 59 and 60, the arrangement being such that each member can pivot independently of the other. However, as best seen in FIG. 4, the sides 57 overlie and are supported by the bottom member 58 when the pocket is in the raised position. A finger 61, forming a part of top member 56, extends to contact a part of the frame 10 to limit the extent to which the top member can pivot downwardly. When the top member is raised, it bears against a leaf spring 62, which then urges the top member downward. A coil spring 63 is connected between eyes on the bottom member 58 and on the frame 10 to resiliently urge the bottom member downward. A shield 64 covers part of the open side of the measuring and dispensing pocket.

A push rod 66 is journaled in frame 10 for an approximately vertical movement longitudinally thereof. The bottom end of the push rod rides on cam surface 22. The upper end of the push rod bears against bottom member 58. When the push rod is riding against the portion 21 of the cam surface 22, the push rod is raised so that it holds the measuring and dispensing pocket in a raised position. When the push rod is on parts 24 or 25 of the cam surface, the push rod is lowered to an extent such that the member 58 is planar with the bottom 67 of the chute 52. At that time the finger 61 of the top member 56 is resting on the frame and there is a separation between the bottom member 58 and the sides 57. Above the measuring and dispensing pocket is a hopper for holding unpopped kernels of corn. This hopper is illustrated by dot-dash lines 68, but its configuration will depend upon the desires of the manufacturer, particularly to meet the configuration of an outer cabinet (not shown).

In the initial prototypes, the pocket was raised only to the extent illustrated in FIG. 1, but with the hopper employed the pocket did not fill consistently. In subsequent prototypes the pocket was raised to a greater extent by lengthening the push rod, thus more consistently filling it.

Figure 9:
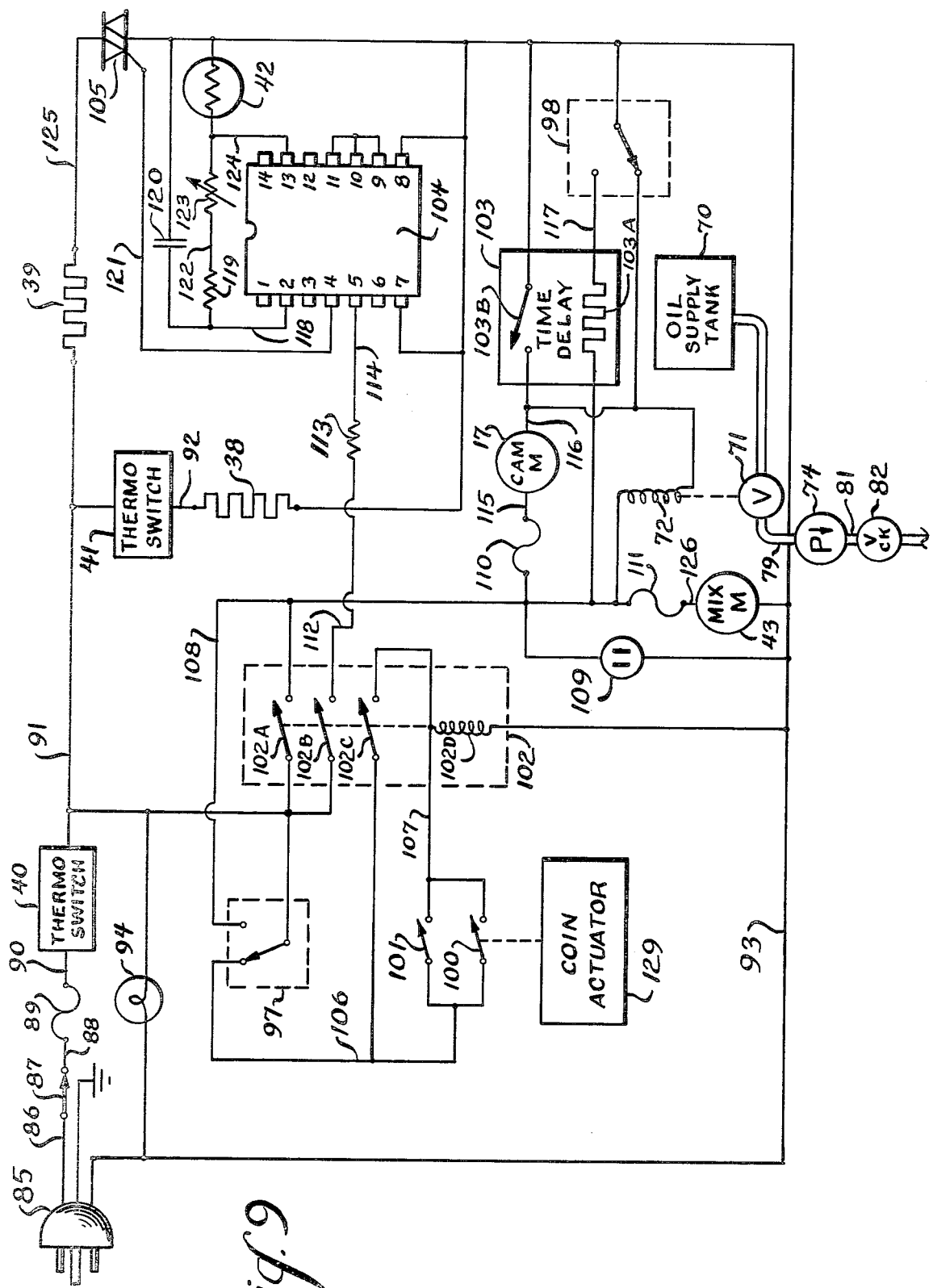
FIG. 9 is a schematic view, principally of the electric controls.

The oil feed apparatus 14 will include an oil supply tank or container 70 (FIG. 9). At the bottom of this tank is a valve 71 operated by a solenoid 72. From valve 71 the popping oil flows by gravity through a duct 73 leading to a pump 74.

Figure 2:
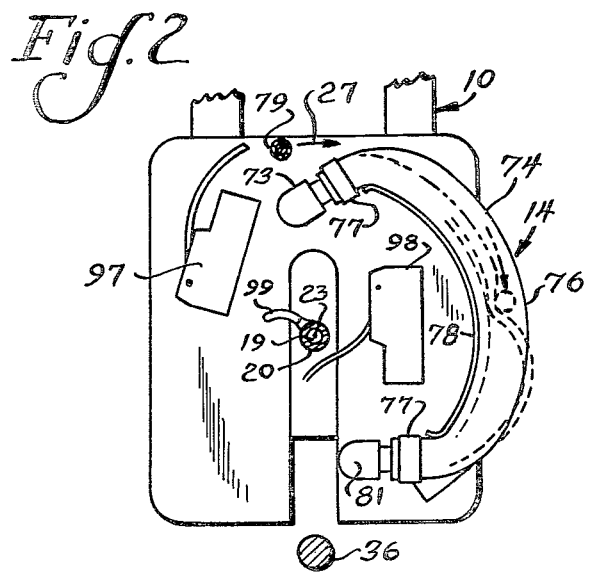
FIG. 2 is a partial section as viewed at line 2—2 of FIG. 1.

The pump is best illustrated in FIG. 2. It comprises a resilient tube conduit 76 fixedly secured at each of its ends by clamps 77. It is aligned in an approximately semicircular configuration about the axis 23 of the cam. In part this alignment is maintained by a backing plate 78 secured to frame 10. The alignment is such that the outer side (the side farthest from axis 23) is in the path of movement of an arm 79 secured to cam 16. This arm has a threaded end which extends through the cam and a nut 80 is screwed onto that threaded end. The exterior of the arm is in the form of a roller to reduce the friction as the arm moves across the tube conduit 76. With the rotation of the cam, the arm moves across the tube conduit commencing at a point adjacent the intake end thereof and as it moves toward the discharge end, the tube is compressed, as illustrated in dotted lines in FIG. 2, progressively along its length. This causes the oil in the tube to be progressively forced toward the discharge end of the pump. A measured quantity of oil is thereby pumped into the popping chamber. A duct 81 connects from the discharge end of the pump to the popping chamber 46. A check valve 82 in this duct permits the oil to flow only in the direction toward the popping chamber.

The electrical controls are best illustrated in FIG. 9. Electricity is supplied through a grounded type plug 85 adapted to be inserted into a 110 volt wall outlet or the like. A wire 86 connects one side of the line to a main switch 87. This switch is normally closed, but may be opened such as when the machine is being serviced. From the main switch a wire 88 connects to the main fuse 89. Thermoswitch 40 is connected to the main fuse by a wire 90. Thermoswitch 40 is a safety switch and is set for its contacts (not shown) to open at a temperature of about 440° F. (226.67° C.). From the other side of thermoswitch 40 a wire 91 connects to heater 39 and thermoswitch 41. Thermoswitch 41 controls the temperature of heater 38 to which it is connected by a wire 92. The other side of heater 38 is connected to the other side of the line which is defined by wire 93 leading from plug 85. A cabinet light 94 is connected between wires 91 and 93 whereby it is always on so long as main switch 87 is closed.

The control apparatus includes a snap-action switch 97 (e.g., Microswitch), and a snap-action switch 98. As best seen in FIG. 2, snap-action switch 97 is mounted so that its actuating arm is moved by cam arm 79 at about the end of the popping cycle. Snap-action switch 98 is mounted so that its arm is actuated by a finger 99, secured to hub 20 and forming a part of the cam, at a point about midway of the popping cycle. The control apparatus also includes start switches 100 and 101, a relay 102, a normally open time delay switch device 103, an integrated circuit device (e.g., No. CA3079) 104, and a Triac 105.

Wire 91 connects to one side of each of switches 102A and 102B of relay 102 and to the common side of switch 97. A wire 106 connects the normally closed contact of switch 97, one side of relay switch 102C and one side of each of start switches 100 and 101. A wire 107 connects the other side of the two start switches with one end of relay solenoid 102D and one side of relay switch 102C. A wire 108 connects the normally open contact of switch 97, one side of relay switch 102A, one side of electrical outlet 109, one side of fuses 110 and 111, one end of heater 103A of time delay switch device 103, and one end of solenoid 72. A wire 112 connects relay switch 102B with resistor 113 which in turn is connected to terminal 5 of the integrated circuit element by a wire 114. A wire 115 connects fuse 110 to cam motor 17. The opposite side of the cam motor is connected by a wire 116 to switch 103B of the time delay switch device, the normally closed contact of snap-action switch 98 and an end of solenoid 72. A normally open contact of switch 98 is connected by a wire 117 to heater 103A. A wire 118 connects terminal 2 of the integrated circuit device with resistor 119 and capacitor 120. A wire 121 connects terminal 4 with the gate of Triac 105. A wire 122 connects fixed resistor 119 to variable resistor 123. A wire 124 connects terminal 13, resistor 123 and thermosensor 42. A wire 125 connects heater 39 to Triac 105. The main supply wire 93 connects to solenoid 102D, outlet 109, stirring motor 43, the common side of switch 98, switch 103B, heater 38, terminals 7 and 8 of the integrated circuit device, temperature sensor 42, capacitor 120 and Triac 105. A wire 126 connects fuse 111 to agitator motor 43.

Start switch 100 forms a part of and is operated by a conventional coin actuator 129. When a coin is placed in the actuator, switch 100 is closed momentarily. Start switch 101 is placed within the cabinet enclosing the machine and is used by a person having access to the interior of the machine when it is desired to run the machine through its popping cycle for observation purposes. The space indicated by the dot-dash line 128 (FIG. 1) is utilized for the mounting of the electrical control apparatus, suitably enclosed.

OPERATION

Heater 38 is used to maintain the temperature of the bottom cover 33 at a level substantially above ambient, but below the normal popping temperature, when the machine is not going through a popping cycle. For example, thermoswitch 41 is set so that heater 38 will maintain a temperature of about 300° F. (148.9° C.). This reduces the time necessary for the popping cycle. It also ensures that the rise in temperature to that required for popping always starts from the same datum, a desirable feature. The standby temperature should be sufficiently low so that residual oil in the bottom cover does not smoke or otherwise suffer deleterious effects which might have adverse taste consequences.

Heater 39 is employed to rapidly raise the temperature of the bottom cover to that suitable for the popping of corn at the start of the popping cycle and to maintain that temperature throughout the popping cycle. For example, using a popping temperature in the range of about 390°–410° F. (198.89°–210° C.) the popping cycle may be about a minute and a half. By raising the popping temperature somewhat, e.g., to about 425° F. (218.33° C.) or so, the popping cycle may be reduced to about one minute, but in my opinion the resulting popcorn is not as satisfactory as that produced at a lower popping temperature. Undoubtedly, each manufacturer or user will have his own views as to what he deems desirable as to the length of the popping cycle and the temperature employed. The sensor 42 detects the temperature of the bottom cover 33 and the integrated circuit device controls the operation of Triac 105 such that the current flow through heater 39 will maintain the desired temperature. The desired temperature is established by suitable manipulation of variable resistor 123.

Of course, before the machine is operated, the hopper of unpopped kernels of corn should be full and there should be a supply of popping oil in tank 70. As a matter of fact, the machine should be operated through several cycles so that the ducts 73 and 81 are also filled with oil. With plug 85 inserted into a wall socket the heater 38 will be energized so as to maintain bottom cover 33 at a standby temperature as previously mentioned.

A popping cycle is initiated by the closing of one of switches 100 or 101. The closing of one of these switches, even though momentary, energizes solenoid 102D of the relay and results in the closing of the three relay switches. Switch 102C forms a holding circuit and keeps the relay coil energized even after the start switch 100 or 101 is reopened. The closing of relay switch 102B energizes the integrated circuit device 104 and results in the Triac 105 being operated so as to energize heater 39. This heater rapidly brings the bottom cover 33 up to popping temperature. Upon reaching that temperature the sensor 42 takes over and the Triac controls the flow of current such as to maintain that temperature.

The closing of relay switch 102A energizes the mixer or stirrer motor 43, the cam motor 17 and the oil valve solenoid 72. This solenoid opens oil valve 71 which has no effect since this valve is merely a safety precaution to prevent the draining of the oil from tank 70 in the event of a malfunction when the machine presumably is shut down. The energizing of motor 43 of course commences the rotation of stirrer 12. The energizing of motor 17 commences the rotation of cam 16 in the direction indicated by arrow 27.

Shortly after cam 16 commences its rotation, the push rod 66 descends into the depression 24. This allows members 56 and 58 to pivot clockwise (as viewed in FIG. 1) under the influence of springs 62 and 63. The motion of member 56 is arrested when finger 61 contacts frame 10, but member 58 moves downwardly until it becomes planar with the bottom 67 of the chute 52. Thus the corn kernels that had filled the measuring and dispensing unit (by gravity from the hopper) descend along the chute 52. The position of the top member 56 and the presence of the shield 64 prevent any kernels from flowing directly from the hopper into the chute, pump that only those kernels that were in the measuring and dispensing pocket can enter the chute. The kernels slide down the chute with sufficient force so as to open door 53, permitting the kernels to enter the popping chamber 46.

The rotation of the cam also brings arm 79 into contact with the resilient tube conduit 76 at the intake end thereof (the intake end being the end connected to duct 73). As the arm 79 moves along the conduit 76, it compresses the conduit as illustrated in dotted lines in FIG. 2, commencing at the intake end of the conduit.

This compression of the conduit progressively moving toward the discharge end (represented by duct 81) causes the oil therein to be pumped in the direction of the popping chamber 46. The oil so pumped moves through duct 81 and into the popping chamber. As best seen in FIG. 1, the duct 81 rises from the pump to the opening where the duct enters the popping chamber. This results in only that oil flowing into the popping chamber which is moved by the pump, and prevents any gravity flow of oil from duct 81 into the popping chamber. The character of the pump 14 is such that the same quantity of oil is pumped into the popping chamber with each revolution of cam 16.

The rotation of the cam during the pumping stage also results in push rod 66 riding up on projection 26 of the cam. This results in a partial raising of bottom member 58, but the raising is insufficient so as to also raise top member 56 to any material extent. Thus no additional corn can flow into the measuring and dispensing pocket from the hopper. But as the push rod 66 drops off of projection 26 onto part 25 of the cam, the member 58 is again dropped to its lowered position co-planar with bottom 67 of the chute. This movement ensures that all of the kernels in the measuring and dispensing pocket are released into the chute. If a jam or blockage of kernels within the pocket had ocurred, this raising of the member 58 and its second descent will break up that blockage or jam and ensure that all of the kernels descend into the chute.

Just after the cam 16 had turned sufficiently far so as to complete the pumping of the measured quantity of oil into the popping chamber, finger 99 on the cam hub actuates the snapaction switch 98. This causes the switch arm to move from the normally closed contact (to which wire 116 is connected) and onto the normally open contact (to which wire 117 is connected). This breaks the circuit to the cam motor 17 causing that motor to stop. It also initiates the period of time delay for which the time delay device 103 is established. Such devices are well known on the market and are purchased with various periods of time delay. For example, the time delay is determined by the length of time that it requires for a heater, such as 103A, to come up to a temperature at which the switch (switch 103B) will be actuated to close (as by means of a bimetal switch arm). Assuming that a total cycle time of one and one half minutes is desired, the period of rotation of cam 16 will be, for example, one-half minute and the time delay device 103 will have a delay period of one minute between the time that the heater 103A is first energized and the switch 103B is closed.

Upon the closing of switch 103B the cam motor 17 is again energized whereupon cam 16 again commences its rotation. Shortly thereafter finger 99 moves away from the actuating arm of switch 98, but the repositioning of this switch does not interrupt the operation. When the large portion 21 of the cam 16 passes arm 36 (the end of this large portion being just to the left of the location of nut 80 in FIG. 3), the arm 36 moves into the depressed part 24 of the cam surface. Thus the cam is no longer holding the bottom cover 33 in the closed position and the cover moves by gravity to the position illustrated in FIG. 8. This permits the popped corn to spill out of the popping chamber and into a discharge chute, not shown. Presumably the person who initiated the popping cycle would have positioned a suitable container (bag, etc.) at the lower end of the discharge chute to receive the popped corn. Since the lower side of the bottom cover is at about a forty-five degree angle, any popped corn that was within the bottom cover would also spill out. This discharge of the contents of the bottom cover is further ensured by the fact that projection 26 will move past lever 36 to depress the lever and raise the cover 33 to a limited extent. When the lever 36 moves off of projection 26 and drops (actually moves upwardly) against the recessed part 25 of the cam (or against a part of frame 10 as illustrated in FIG. 8) there is a bouncing of the cover which further ensures that its contents are discharged therefrom.

As the cam 16 approaches its final position, the arm 79 contacts the actuating arm of the snap-action switch 97. This moves the switch arm from the normally closed contact of the switch (to which wire 106 is connected) onto the normally open contact (to which wire 108 is connected). The movement of the switch arm away from the normally closed contact deenergizes the solenoid 102D of the relay, permitting the relay switches to drop open. However, since the arm of switch 97 is now energizing wire 108, the motors 17 and 43 continue to run. The continued movement of the cam causes arm 79 attached thereto to release the actuating arm of switch 97 deenergizing motors 17 and 43 (and the cam will coast briefly thereafter). The releasing of its switch actuating arm causes switch 97 to return to the position illustrated in FIG. 9; however, the reenergizing of wire 106 has no effect since switches 102C, 101 and 100 are all now open. Solenoid 72 also is deenergized allowing valve 71 to close.

The power outlet 109 is for the purpose of energizing various other devices during the popping cycle. For example, a flashing light system can be plugged into this socket and those lights will flash throughout the popping cycle. Another alternative would be to have a tape recorder plugged into this socket which would play music during the popping cycle.

Various alternatives will be apparent to knowledgeable individuals from the above description. For example, in place of the mechanical relay 102, the electronic equivalent thereof could be employed (see, for example, GE's SCR Manual, Second Edition, 1961, page 90, and the Fourth Edition, 1967, page 294) and the term "relay" as used herein includes an electronic equivalent. While cam 16 is a single revolution cam it would be possible to use a double cam which turns only one-half revolution for each popping cycle. In the disclosed embodiment the bottom cover 33 is biased open by gravity and held closed by the cam, but as an alternative the cover could be biased closed with a spring and moved to the open position by cam pressure. In place of the electronic control for heater 39 (i.e., Triac 105, sensor 42, etc.) a mechanical thermoswitch could be employed. This alternative is deemed less satisfactory because of contact problems that can develop in this application.

I claim:

1. An automatic popcorn popping machine comprising in combination a frame, a generally cylindrical popping vessel defining a popping chamber, said vessel including a separable bottom cover for said chamber; cover operating means pivotally mounting said cover for movement about a first axis from a first position at which said cover is in juxtaposition to the remainder of said vessel to close said chamber for popping purposes and a second position at which said cover is displaced from the remainder of said vessel to permit the contents of said vessel to descend out of said chamber; electric heater means thermally connected to said cover for heating the cover; rotary stirring means extending into said vessel for moving the corn within said chamber; corn measuring and dispensing means communicating with said chamber for introducing a measured quantity of unpopped corn into said chamber; popping oil dispensing means communicating with said chamber for introducing a measured quantity of popping oil into said chamber; and power means operatively connected to said stirring means, said cover operating means, said corn dispensing means and said oil dispensing means for operating through a popping cycle and during that cycle rotating said stirring means and sequentially positioning said cover in said first position, introducing unpopped corn and popping oil into said chamber and, after sufficient time for said corn to have popped, positioning said cover in said second position, said machine being characterized by:

said power means including a cam rotating about an axis during the popping cycle and having a cam surface; and said cover operating means including a lever pivotable about said first axis coincident with the pivotal movement of the cover, said lever having a portion spaced from said first axis and bearing against said cam surface, and means biasing said cover to one of said positions, said cam acting on said lever to move the cover to the other of said positions against said biasing.

2. A machine as set forth in claim 1, wherein said lever extends both sides of said first axis and said portion is at one side of said first axis, the portion of the lever to the other side of the first axis being secured to the cover, said means biasing the cover being the weight of the cover and the pull of gravity on that weight, said cam being above the first mentioned lever portion with that lever portion bearing against the lower side of the cam surface.

3. A machine as set forth in claim 1, including a hopper for holding a supply of unpopped corn;

wherein said corn dispensing means comprises a chute having an upper end and a lower end, said lower end communicating with said chamber;

a measuring pocket mounted adjacent said upper end and movable between a first position at which it is out of communication with said chute and in communication with said hopper to be filled with corn from said hopper and a second position at which it is out of communication with said hopper and in communication with said chute to permit the corn in the pocket to descend into the chute and thence into said chamber; and means bearing against said cam surface and operatively connecting said measuring pocket for moving said pocket from said first to said second position thereof when said corn is to be introduced into said chamber and thereafter returning said pocket to said first position.

4. A machine as set forth in claim 3, wherein said hopper has a bottom, said measuring pocket comprises a top member and a bottom member, said members having an edge of each in juxtaposition to an edge of the other, said members being independently pivotally connected to said frame at said edge, the top member having sides extending down to contact the bottom member and to support the top member on the bottom member when said pocket is in the first position, said top member and frame including means to support said top member approximately level with said hopper bottom when said pocket is in the second position, and said means operatively connecting said pocket and said cam comprises a push rod journaled in said frame for longitudinal movement, said push rod having a bottom end bearing against said cam and a top end bearing against said bottom member.

5. A machine as set forth in claim 2, wherein said cam rotates through one revolution during said popping cycle, said cam has a major portion of said surface equidistant from said cam axis, the remaining portion of said surface comprises at least one part wherein said surface curves rapidly toward said cam axis, said major portion bears against said portion of lever during the initial part of said popping cycle, and the remaining portion of said surface bears against said portion of said lever during the final part of said popping cycle.

6. A machine as set forth in claim 5, including a hopper for holding a supply of unpopped corn;

wherein said corn dispensing means comprises a chute having an upper end and a lower end, said lower end communicating with said chamber;

a measuring pocket mounted adjacent said upper end and movable between a first position at which it is out of communication with said chute and in communication with said hopper to be filled with corn from said hopper and a second position at which it is out of communication with said hopper and in communication with said chute to permit the corn in the pocket to descend into the chute and thence into said chamber, said measuring pocket being approximately above said cam, and means operatively connecting said measuring pocket and said cam for moving said pocket from said first to said second position thereof when said corn is to be introduced into said chamber and thereafter returning said pocket to said first position and comprising a push rod having two ends, said push rod being above said cam and journaled in said frame for movement longitudinally thereof, one of said rod ends bearing against said cam surface, the other of the rod ends operatively engaging said measuring pocket.

7. A machine as set forth in claim 1 and including control means, said machine being further characterized by:

said power means comprising two electric motors each having speed reducing gear boxes with output shafts, the output shaft driven by one motor being coaxial with said vessel and being secured to said stirring means, the output shaft driven by the second motor being coaxial with said cam and being secured thereto; and said control means comprising:

a cycle start switch;

electric circuit means for said second motor and including switch means actuated by said cam for initiating deenergizing of the second motor for a given period of time when said cam reaches a given point in its cycle;

relay means connected to said start switch to be activated thereby, said relay means having normal open switch means closed when said relay means is activated, said switch means being connected to said one motor, to said heater means for energizing them approximately throughout said popping cycle, and to said electric circuit means for energizing said electric circuit means; and cycletermination switch means actuated by said cam at the end of its cycle and connected to said relay means for deactivating the relay means.

* * * * *

UNITED STATES PATENT AND TRADEMARK OFFICE
CERTIFICATE OF CORRECTION

PATENT NO. : 4,182,229
DATED : January 8, 1980
INVENTOR(S) : James R. Vande Walker It is certified that error appears in the above-identified patent and that said Letters Patent are hereby corrected as shown below:

Column 1, line 20, "characters" should read --character--.
Column 1, line 42, "xpensible" should read --expansible--.
Column 1, line 43, delete "expansible" and insert --on--.
Column 3, line 19, "in" should read --is--.
Column 3, line 33, "kernals" should read --kernels--.
Column 3, line 35, "kernals" should read --kernels--.
Column 3, line 39, "kernals" should read --kernels--.
Column 6, line 58, delete "pump" and insert --so--.

Signed and Sealed this

Thirteenth Day of May 1980

[SEAL]

Attest:

SIDNEY A. DIAMOND

Attesting Officer

Commissioner of Patents and Trademarks